UNITED STATES PATENT OFFICE.

CARLE R. HAYWARD, OF QUINCY, AND HENRY M. SCHLEICHER, OF BOSTON, MASSACHUSETTS, ASSIGNORS TO AMERICAN METAL COMPANY, LTD., OF NEW YORK, N. Y., A CORPORATION OF NEW YORK.

TREATMENT OF SLATE.

1,415,346.   Specification of Letters Patent.   Patented May 9, 1922.

No Drawing.   Application filed March 4, 1920. Serial No. 363,240.

*To all whom it may concern:*

Be it known that we, CARLE R. HAYWARD, a citizen of the United States, residing at Quincy, county of Norfolk, State of Massachusetts, and whose post-office address is 69 Massachusetts Avenue, Cambridge, Mass., and HENRY M. SCHLEICHER, a citizen of the United States, residing at Boston, county of Suffolk, State of Massachusetts, and whose post-office address is 69 Massachusetts Avenue, Cambridge, Mass., have invented certain new and useful Improvements in the Treatment of Slate; and we do hereby declare the following to be a full, clear, and exact description of the invention, such as will enable others skilled in the art to which it appertains, to make and use the same.

This invention relates to the treatment of slate for the recovery of potash and alumina therefrom.

Slate such as is found, for example, in Georgia, varies somewhat in its composition, but the following is the analysis of a representative sample thereof:

Potassium oxide ($K_2O$) about 9%,
Alumina ($Al_2O_3$) about 20%,
Silica ($SiO_2$) about 55%,
Ferric oxide ($Fe_2O_3$) about 9%,
Ferrous oxide (FeO) about $3\frac{1}{2}$%,
Loss on ignition about $3\frac{1}{2}$%.

We have found that if such slate, in a finely divided state, is mixed with sulfuric acid and heated, there is a sudden and sharp rise in temperature when the temperature of the mixture reaches about 150° C., indicating that a strongly exothermic reaction has taken place in the mixture. As a result of this reaction, the slate is decomposed and sulfatized, and, if the resulting product is leached with water, a considerable portion of the slate constituents is dissolved as sulfates, and can thus be separated from the insoluble residue.

We have further found that the sulfatization can be increased and promoted by observing proper conditions, namely; first, using an excess of sulfuric acid, that is more than is theoretically required to satisfy the metals to be converted into sulfates; secondly, continuing the heating for a longer period of time; and, thirdly, increasing the pressure on the mixture during the heating.

We have found, however, that it is important to avoid too high a temperature at the beginning of the treatment. The heater used should not be maintained at a temperature above 200° C. at that time. After the strong reaction noted above has taken place, the temperature can be allowed to rise somewhat above 200° C., but this is not necessary unless it is desired to decompose certain of the sulfates formed in the reaction.

The slate which is to be treated with the sulfuric acid should advantageously be pulverized, for example, so as to pass a 100 mesh sieve. The acid employed may be concentrated sulfuric acid (66° Baumé); but we have found that 60° Baumé acid will give satisfactory results, and that a stronger acid is not, therefore, required.

The acid and slate should be thoroughly mixed. If mixed cold, they should form a wet pulp; if hot when mixed, the two substances should form a dry granular product.

The amount of acid can be varied somewhat, but should, in general, be equivalent to the theoretical amount required to convert all of the potash, alumina and iron in the slate to sulfates, or somewhat more than is required for this purpose. More than 75% of the three constituents above referred to, namely, potash, alumina and iron, have been converted into soluble sulfates in the manner above referred to, for example, by treating the mixture for a period of about three hours at a temperature of about 160° C.

It is also of advantage to calcine the slate at about 250° C. before the acid treatment, and in this case the acid can be admixed with the hot slate thus utilizing the heat contained therein and also obtaining a dry granular product which can be readily furnaced. Such treatment we have found will increase the amounts of the constituents rendered soluble.

By subjecting the sulfatized product to leaching with water, or with a sulfate solution, or with sulfuric acid, or a sulfuric acid solution of potassium sulfate, the soluble sulfates can be leached from the product and obtained in the form of a solution which can be separated from the insoluble residue by filtration or otherwise. This solution can be then further treated for the recovery of potash and alumina therefrom, for example, in the form of alum by subjecting the concentrated or saturated solution to crystallization. The alum crystals formed will be low in iron, so that the separation of the potash and alumina from the iron can be, to a considerable degree, effected in this manner. Any iron contained in the alum can be eliminated therefrom by recrystallization. The solution can be otherwise treated for the recovery of the iron and the alumina therefrom, but the simple leaching of the sulfatized product to produce a concentrated solution when hot will result in the crystallization of alum therefrom on cooling.

Since alum contains one molecule each of aluminum sulfate and potassium sulfate, any deficiency of either in the solution should be supplied if all of the two is to be recovered as alum. For instance, in the case of the slate above referred to, the solution will contain more aluminum sulfate than potassium sulfate, and therefore an amount of potassium sulfate should be added equivalent to the excess of aluminum sulfate if all of the aluminum sulfate is to be recovered as alum. The potassium sulfate thus returned may be that recovered from the alum so obtained, by subsequent treatment. This extra sulfate may be added to the leach liquor, or it may be added to the slate either with the acid or with the leaching agent.

In carrying out the leaching it is of advantage to use the minimum amount of water and to carry out the leaching on the counter-current principle, so that the fresh water will come in contact with the already partly extracted product and the fresh product into contact with the already partly saturated solution.

The leaching operation can also be carried out with advantage by using, as the leach liquor, the mother liquor remaining after the crystallization therefrom of the alum, or the acid liquor resulting from the decomposition of the alum by heating at a high temperature and pressure and separating the precipitated alumina or basic aluminum compounds therefrom.

So also, in the leaching operation, advantage can be taken of the high temperature of the sulfatized product by adding this product, while still at or somewhat below the temperature of sulfatizing, to the leach liquor, or by treating the hot sulfatized product with the leach liquor. In this manner the heat of the product itself will suffice to heat the leach liquor so that there can be directly produced a hot concentrated solution of the sulfates extracted, which solution, upon cooling, will precipitate alum therefrom.

We claim:

1. The method of treating potassiferous slate for the recovery of potassium and aluminum therefrom, which comprises treating the slate with sulfuric acid at an elevated temperature, leaching out the soluble sulfates, and recovering potassium alum from the solution by crystallization.

2. The method of treating potassiferous slate for the recovery of potassium and aluminum therefrom, which comprises treating the slate with sulfuric acid at an elevated temperature and pressure, leaching out the soluble sulfates and crystallizing out potassium alum.

3. The method of treating potassiferous slate for the recovery of potassium and aluminum therefrom, which comprises treating the slate with sulfuric acid at an elevated temperature and pressure, leaching out the soluble sulfates, adding a potassium salt, and crystallizing out potassium alum.

4. The method of treating potassiferous slate for the recovery of potassium and aluminum therefrom, which comprises pulverizing the slate, calcining it and mixing it while still hot with sulfuric acid, subjecting the mixture to further heat and pressure for sulfatizing it, leaching out the soluble sulfates, adding a potassium salt, and crystallizing out potassium alum.

In testimony whereof we affix our signatures.

CARLE R. HAYWARD.
HENRY M. SCHLEICHER.